June 19, 1956  R. A. GANZE  2,750,976
APPLE CELLING AND SLICING MACHINE
Filed July 29, 1952  2 Sheets-Sheet 1

INVENTOR.
RONALD A. GANZE
BY
Beau Brooks Buckley & Beau
ATTORNEYS

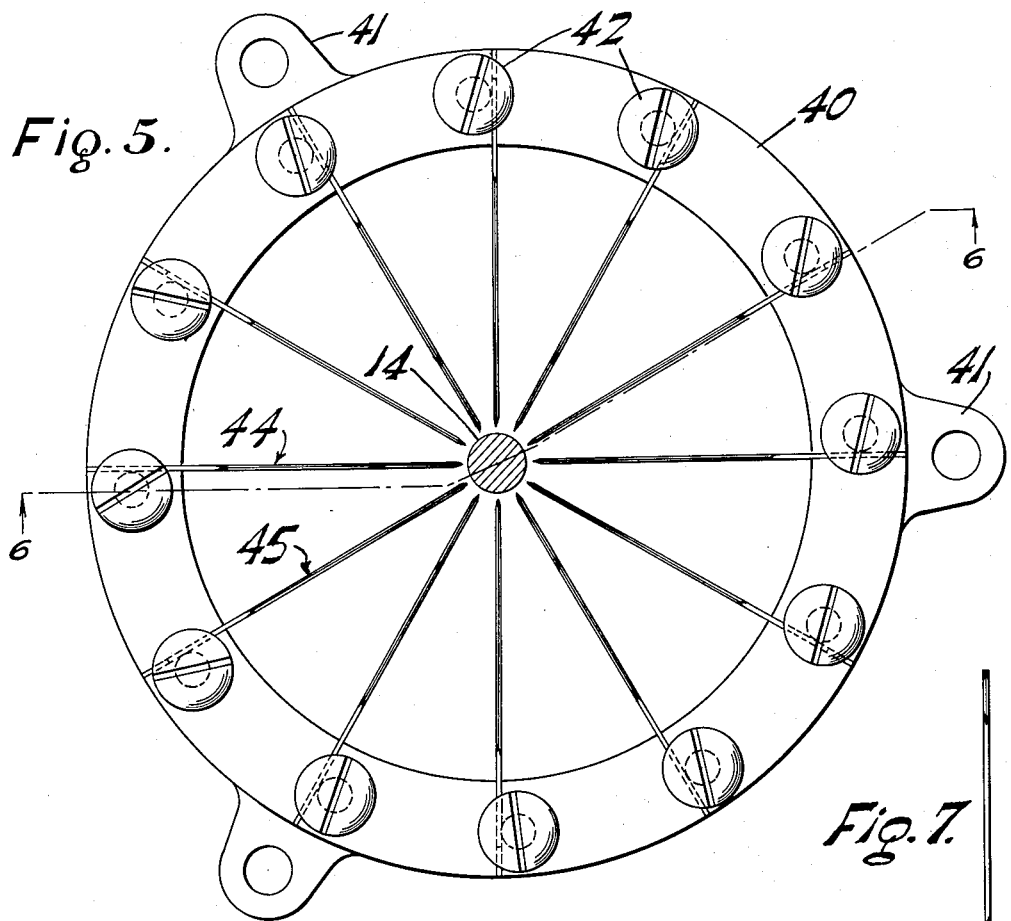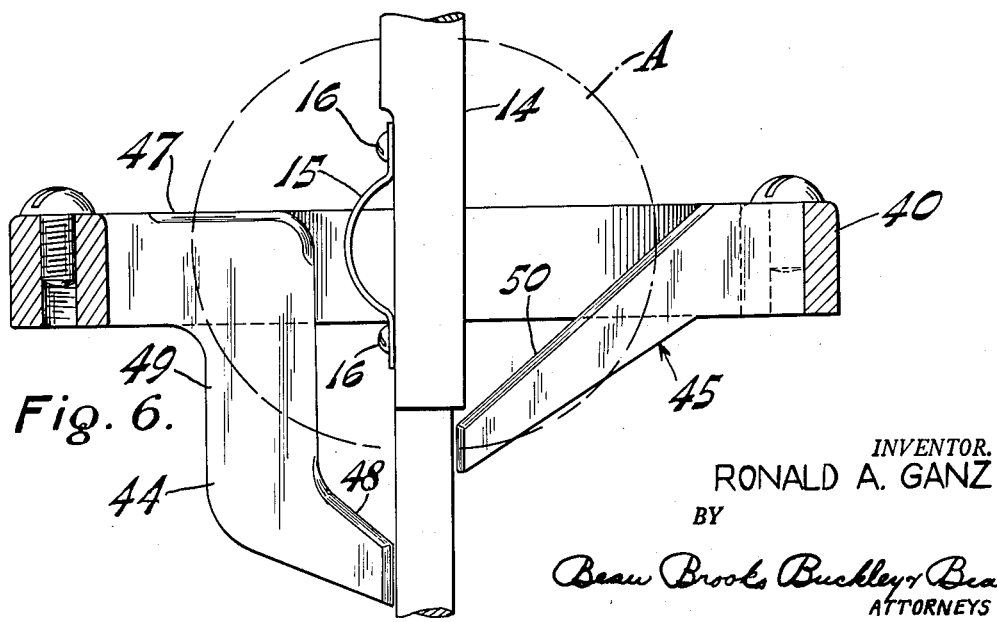

United States Patent Office 2,750,976
Patented June 19, 1956

2,750,976
APPLE CELLING AND SLICING MACHINE

Ronald A. Ganze, Marion, N. Y., assignor to F. B. Pease Company, Inc., Rochester, N. Y.

Application July 29, 1952, Serial No. 301,478

5 Claims. (Cl. 146—40)

This invention relates to machines for seed-celling and slicing apples and similar fruits.

In preparing apples for cooking, canning, drying or deep freezing, it is customary, in commercial operation, to first pare and core the apples and then feed them into a machine where their seed-cells are removed and the apples are sliced radially into any desired number of segments. A common type of seed-celling and slicing machine comprises a spindle for receiving a succession of cored apples which move along the spindle to be successively seed-celled and sliced.

In the general type of seed-celling and slicing machine here under consideration, each apple is moved into partial engagement with the slicing knives and is held against rotation by such knives while a seed-celling knife carried by the spindle cuts out the seed-cells by rotation of the spindle. The apple is then pushed farther along the spindle to be fully sliced by the slicing blades.

Machines of this general type have heretofore been found to be the most satisfactory thus far available, but the percentage of fruit which bursts during the seed-celling operation or at least prior to complete slicing has been an important and expensive failing. The most trouble along this line is encountered when the fruit is unusually soft and fully ripe.

Furthermore, the relationship of the seed-celling knife and the slicing blades is fixed and accordingly the apples, when they are in position to be seed-celled, are partially sliced to a greater or lesser degree, depending on their individual sizes. This further aggravates the problem of retaining apples in sound and integral condition until they are seed-celled and sliced.

The present invention provides a slicing arrangement wherein the slicing knives are utilized to retain the fruit against rotation during seed-celling but one wherein the presence of the slicing knives actually assists in the prevention of splitting or bursting of the fruit during seed-celling and slicing, rather than adding to the danger of splitting or bursting as has been the past tendency of the partial slicing of the fruit prior to seed-celling.

Further, in slicing knives of this general class the arrangement has been such, in prior art construction, that the several knives have effected their slicing function more or less simultaneously or, at least, all of the knives have been jointly present in the fruit at the same time. I have found that this condition in and of itself aggravates the danger and likelihood of splitting or bursting of the fruit. While the individual knives are relatively thin, it is common to have as many as twelve or more radial knives and with all of these knives, or at least substantial portions of each of them present in a single piece of fruit at the same time, the total displacement of fruit is enough to cause a material spreading and consequent bulging of the piece of fruit.

In the present invention the slicing knives are so arranged that several groups of blades cut in at least a partially successive manner and in such fashion that major portions of the knives of one group have left the fruit or have moved axially along to a different location in the fruit by the time that another group of knives materially enters the fruit. This sequential passage of the knives is particularly true at the more central parts of the fruit where the simultaneous presence of a plurality of knives is particularly inimical.

In the arrangement of the present invention, the radial knives, or certain of them, are preferably so shaped and proportioned that they form an encompassing or surrounding and containing means which greatly assists in retaining the integrity of the fruit during the rotation of the seed-celling knife in the interior of the fruit, the latter exerting an inevitably spreading or bursting force on the cored fruit.

Other advantages of the seed-celling and slicing arrangement which forms the subject matter of the present invention will appear to those skilled in this art from a consideration of the exemplary embodiment illustrated in the accompanying drawing and described in detail in the following specification. However, it is to be understood that the form thus set forth by way of example is subject to considerable mechanical variation and modification without departing from the underlying principles of the present invention. The spirit and scope of the invention is not restricted otherwise than as defined in the appended claims.

In the drawing:

Fig. 5 is a view similar to Fig. 2 but showing another embodiment of the slicing knife unit of the present invention;

Fig. 6 is a view similar to Fig. 3 but showing the slicing knife embodiment of Fig. 5; and Fig. 7 is a horizontal elevational view looking edgewise at one of the slicing blades of the embodiment of Figs. 5 and 6.

Figure 1:
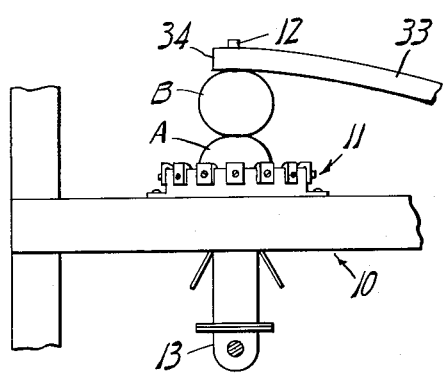
Fig. 1 is a somewhat schematic fragmentary general elevational view of a seed-celling and slicing machine constructed in accordance with one embodiment of the present invention.

In the drawings like characters of reference denote like parts and, referring particularly to Fig. 1, the numeral 10 designates generally the framework of a seed-celling and slicing machine which is shown only fragmentarily in Fig. 1. A slicing ring or spider, designated generally 11 in Fig. 1, is supported by framework 10 and a vertical fruit-receiving spindle 12 extends concentrically through the slicing ring 11 and is supported at its lower end for driving rotation by a transmission housing 13 which is fixed to the framework 10. The details of construction of the framework and the spindle mounting, excepting as they will be later described in detail herein, is conventional and well-known.

Figure 2:
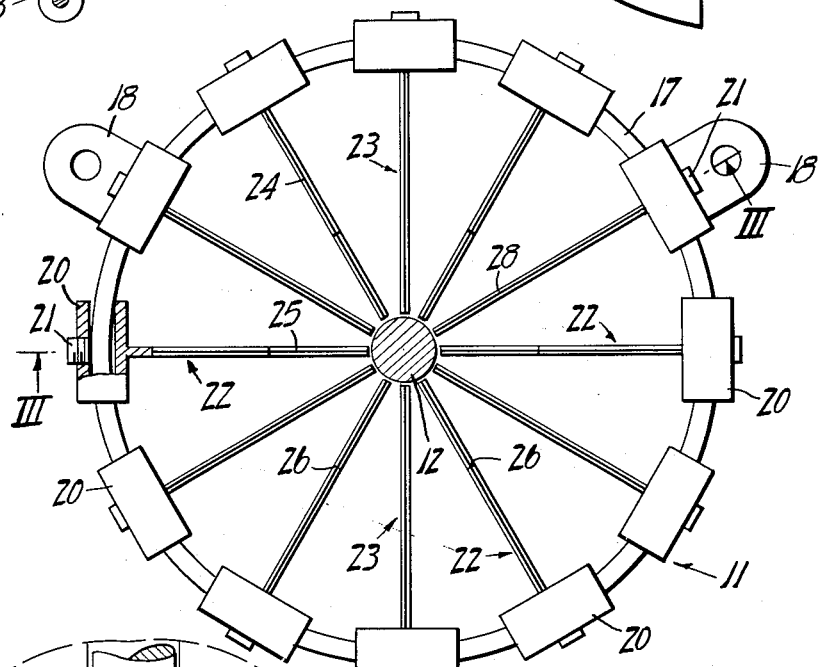
Fig. 2 is an enlarged top plan view of the slicing knife unit of Fig. 1.

The spindle 12, as has been stated, is supported at its lower end by rotating drive means in transmission housing 13 so that its vertical position is fixed independently of the stationary slicing ring 11. Spindle 12 is flattened as at 14 and a bowed seed-celling knfe 15 is fixed thereto as by means of screws 16. The slicing ring or spider 11 comprises an outer ring 17 having lugs or flanges 18 for detachable securement to framework 10 and a series of adjustable radially disposed slicing knife elements which will now be described, referring particularly to the embodiment of the invention shown in detail in Figs. 2, 3, and 4.

Each individual slicing knife or blade includes an adjustable holder or clamp in the form of an inverted channel 20 which engages over ring 17 and is locked thereto in any desired circumferential position by means of a setscrew 21. These holders are each provided with a knife blade portion which projects radially inwardly therefrom, and the blades are of two distinct shapes, arranged alternately. The two different types of slicing blades are designated generally 22 and 23 and their respective profiles are clearly illustrated in Fig. 3.

Each slicing knife or blade 22 has an outer or upper slicing edge portion 24 and an inner or lower slicing edge portion 25 at a substantially lower level. The thus stepped outer and inner slicing edges are connected by a generally vertical edge portion which is not a slicing edge but a relatively blunt edge which in forms shown herein by way of example are preferably substantially square as at 26 in Fig. 3. In the form illustrated in Figs. 1 through 4 by way of example the slicing edge portions 24 are convex and curve inwardly downwardly, and the slicing edge portions 25 are concave and extend downwardly toward the axis of spindle 12.

Figure 3:
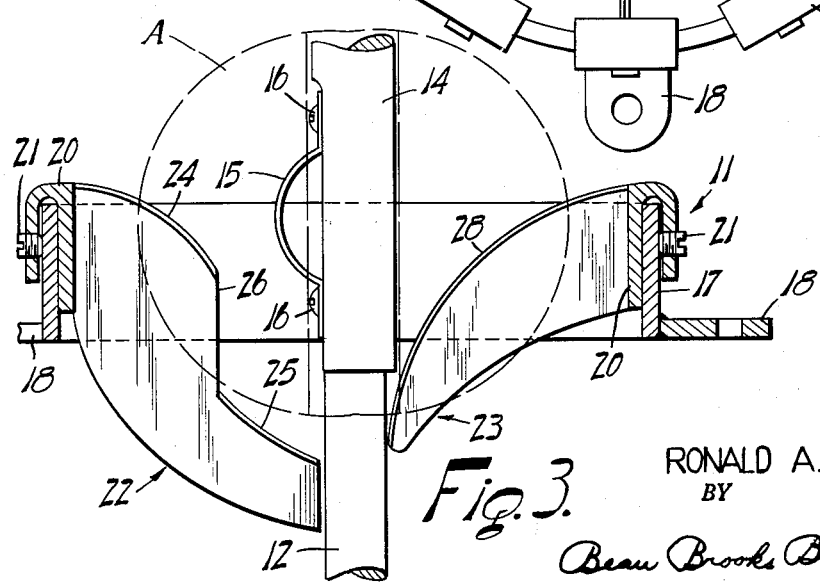
Fig. 3 is a central vertical cross-sectional view of the seed-celling knife and slicing knife portion of the apparatus taken approximately on the line III—III of Fig. 2.

While the flat plates which make up the slicing knives 22 are relatively thin individually, the multiplicity of blunt, generally vertical edges 26 which face the spindle axis and surround the central portion of an apple when it is in the seed-celling position shown in Fig. 3 cooperate to perform a very efficient and important confining function which imposes a material restraint against splitting or bursting of the fruit. This function is, of course, of especial importance in view of the tendency of the rotating seed-celling knife to spread the fruit outwardly and, in the present invention, cooperates in a novel manner with the alternate knife arrangement referred to briefly above and which will now be described in greater detail.

The exact vertical extent of the blunt edges 26 and the diameter of the circle along which they lie when viewed in plan may vary, and the optimum dimensions in this respect will depend upon the range of fruit sizes which are to be dealt with in a given situation.

Figure 4:
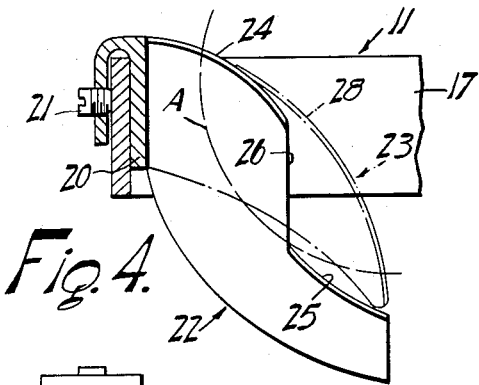
Fig. 4 is a fragmentary view similar to Fig. 3 but showing diagrammatically and superposed a pair of dissimilar knives to illustrate their relative shape and extent.

Referring to Fig. 3, the knives 23 which alternate with knives 22 about the ring 17 are of a generally scimitar shape with convex upper cutting edges 28. In the illustration set forth herein by way of example there are twelve knives altogether, six knives 22 and six knives 23, arranged alternately, so that a piece of fruit will be sliced into twelve segments. Fig. 4 is a schematic view in which a knife 23 in dot-and-dash lines has been superimposed upon one of the knives 22 to illustrate their relative cutting positions in a piece of fruit.

It was noted in the preamble hereto that, apart from other factors, the mere simultaneous presence of a number of knives in a piece of fruit at one time brings about a material fruit-bursting tendency. This tendency is greater at the more central portions of the fruit than at the outer peripheral portions because at the greater diameters near the periphery of the fruit there is a greater expanse of fruit to tolerate the arcuate compressive forces which the knives exert on the fruit.

Having these considerations in mind and referring to Fig. 4 especially, it will be noted that the more central portion of knife 22, that part which includes inner knife edge 25, is entirely out of registry with the overlying portion of knife 23, the two portions being vertically spaced so that the latter will have completed its cutting function and will have passed upwardly into another part of the fruit before entry thereinto of the knife edge 25. Thus, the effective presence of the blades in the central part of the fruit, and in all parts excepting the outermost part, has been so distributed as to be virtually cut in half. In other words, in the center of the fruit where the crowding is most severe is where slicing by the alternate knives is fully staggered or offset.

The fact that knife portion 24 of knife 22 and the corresponding cutting edge portion of knife 23 are simultaneously present in the fruit is of minor importance since these knife portions operate only in those parts of the fruit which are of greatest diameter and, therefore, least affected by the presence of the blades. Smaller fruit, which has a thinner effective annular wall after coring and is thus weaker, will be acted upon less by the knife portions 24 and, during seed-celling, will be held against rotation mainly by the inner parts of knives 23.

The form of the present invention illustrated in Figs. 5, 6 and 7 has certain basic points of similarity with the form of the invention thus far described and differs therefrom chiefly in the manner in which the knives are associated with the spider ring and in the specific contour of the knives themselves.

The seed-celling spindle 14 and the seed celling knife 15 are the same as in the previously described embodiment and accordingly the same reference numerals are employed to designate these parts in the illustration of the embodiment of Figs. 5, 6 and 7. In Figs. 5 and 6 the reference numeral 40 denotes the outer ring of the slicing spider and lugs or ears 41 extending therefrom are provided for detachably securing ring 40 to the framework 10 of the machine generally, just as in the previously described embodiment.

In the embodiment now being described, the knives are not adjustable circumferentially about the ring 40 and the latter is provided with a series of radial slots or kerfs which receive the outer ends of the several knives, the latter being held in these slots or kerfs by means of screws 42, the heads of which bear upon the upper portions of the outer ends of the knives. As in the previously described embodiment, there are two alternate series of knives having different slicing edge contours. The knives of one series are indicated generally by the numeral 44 in Fig. 6 and the knives of the other alternating series are indicated generally at 45 in Fig. 6.

It will be noted that the knives 44 bear a general resemblance to the knives 22 of Fig. 3 in that they are provided with stepped upper and lower outer and inner cutting edge portions 47 and 48 connected by an intermediate generally upright body portion 49. In this form of the invention, and referring particularly to the knives 44, their upper cutting edges 47 extend generally horizontally whereas their lower and inner cutting edge portions 48 decline downwardly toward the axis of spindle 14. The inner edge of the intermediate portion 49 is unsharpened excepting at its upper and lower extremities so that the main portion thereof presents a blunt edge toward the axis of the spindle 14 for accomplishing substantially the same general purpose and result as the edge portion 26 of each knife 22 of the previously described embodiment.

The knives 45 of the present embodiment generally resemble the knives 23 of the embodiments of Figs. 1 through 4 excepting that their upper cutting edge portions 50 extend in a straight line sloping downwardly toward the axis of spindle 14, instead of being curved as at 28 in the case of the knives 23 of Figs. 1 through 4.

In the case of both of the cutting spiders previously illustrated and described herein, it is unnecessary to send the entire slicing head to the factory or other relatively remote point for repair or replacement when a single knife breaks or requires sharpening. Individual slicing blades may be inserted and removed at will and may be rearranged as desired in the respective supporting rings.

Referring to both forms of the invention shown and described herein, it will be noted that the degree to which cutting by the stepped blades has progressed in Figs. 3 and 6 is such that there is a substantial amount of the body of the apple which lies below the seed-celling point which is uncut at the time of celling. This contributes materially to reducing the possibility of bursting of the fruit during seed-celling.

It will further be noted that the inner-free ends of all of the knives in both forms of the invention underlie the enlarged seed-celling portions of the spindle 14 and thus extend inwardly beyond the seed-celling knife. This prevents pieces of carpel tissue dislodged during seed-celling from becoming jammed at the center of the slicing spider and this inner projection of the knives together with their downwardly inclined center portions forces these extraneous tissues through the center part of the spider along with the material removed from the apple in seed-celling.

The cored apples indicated in dash lines at A in Figs. 3, 4, and 6 is by way of schematic illustration only, and does not necessarily depict ideal relationship of the knife edges relative to a given fruit size and seed-celling knife size.

Also, the slicing knife edges of the two embodiments are shown as having specific contours, but these edges may vary considerably from the illustrated contours for various reasons while maintaining their desired stepped relation, and thus maintaining both the containing function of the generally vertical blunt edges and the sequential cutting action of the upper and lower knife edge portions of the stepped knives.

The general details of construction and operation of the machine apart from the specific details described above is well-known and conventional. Referring to Fig. 1, a swinging arm 33 has a forked end 34 which swings downwardly between successive seed-celling operations to push apple A through the slicing ring through the intervention of an overlying apple B, this operation completing the slicing of apple A and disposing apple B in position for seed-celling.

As mentioned above, the individual knives may be readily removed for sharpening or replacement, and in the form of the invention shown in Figs. 1 through 4 they may also be readily adjusted circumferentially to slice fruit into any desired number of segmental slices. In the form shown in Figs. 5, 6 and 7 the spiders may be used to slice apples into any number of segments for which kerfs or grooves are provided in the outer ring and, by removing alternate blades, any sub-multiple of the number of blades for which kerfs or grooves are provided may be employed.

What is claimed is:

1. In a seed-celling and slicing machine, a rotary spindle, a seed-celling knife carried by said spindle, a slicing spider coaxial with said spindle and comprising two sets of alternately disposed radial slicing blades, means carried by said machine and operable to move cored fruit axially along said spindle toward and past said seed-celling knife and against said radial slicing blades, the portions of the slicing blades of one set which lie adjacent to said spindle being offset and spaced in an axial direction from the portions of the slicing blades of the other set which lie adjacent to the spindle whereby said offset portions enter the central portions of the fruit after the corresponding blade portions of the other set have sliced and passed through said central portions.

2. In a seed-celling and slicing machine, a rotary spindle, a seed-celling knife carried by said spindle, a slicing spider coaxial with said spindle and comprising two sets of alternately disposed radial slicing blades, means carried by said machine and operable to move cored fruit axially along said spindle toward and past said seed-celling knife and against said radial slicing blades, the portions of the slicing blades of one set which lie adjacent to said spindle being offset and spaced from the corresponding blade portions of the other set in an axial direction whereby said offset portions enter the central portions of the fruit after the corresponding blade portions of the other set have sliced and passed through said central portions, said one set of blades having relatively blunt edge portions connecting said offset portions with the blades proper and extending generally parallel to and facing the spindle axis.

3. In a fruit slicing machine, a spindle for receiving cored fruit, a slicing spider coaxial with said spindle and comprising two sets of alternately disposed radial slicing blades, the portions of the slicing blades of one set which lie adjacent to said spindle being offset and spaced from the corresponding blade portions of the other set in an axial direction whereby said offset portions enter the central portions of the fruit after the corresponding blade portions of the other set have sliced and passed through said central portions, said one set of blades having relatively blunt edge portions connecting said offset portions with the blades proper and extending generally parallel to and facing the spindle axis.

4. In a fruit slicing machine, a spindle for receiving cored fruit, a slicing spider coaxial with said spindle and comprising two sets of alternately disposed radial slicing blades, the slicing blades of one set having outer cutting edge portions and more central cutting edge portions offset from the outer cutting edge portions and from the central blade portions of the other set in an axial direction whereby said offset cutting edge portions enter the central portions of the fruit after the other blades have sliced and passed through said central portions.

5. A slicing spider for use in a fruit slicing machine comprising two sets of alternately disposed radial slicing blades having generally radially extending cutting edge portions, the portions of the slicing blades of one set which lie adjacent to the axis of radiation of said blades being offset axially from the corresponding blade portions of the other set whereby said offset portions enter the central portions of the fruit after the other blades have sliced and passed through said central portions, said one set of blades having relatively blunt edge portions connecting said offset portions with the blades proper and extending generally parallel to and facing the axis of radiation of said blades.

References Cited in the file of this patent

UNITED STATES PATENTS

| | | |
|---|---|---|
| 419,722 | Siersdorfer | Jan. 21, 1890 |
| 1,244,038 | Drew | Oct. 23, 1917 |
| 1,399,950 | Fish | Dec. 13, 1921 |
| 2,496,637 | Pease | Feb. 7, 1950 |
| 2,509,781 | Pease | May 30, 1950 |
| 2,581,294 | Read et al. | Jan. 1, 1952 |

FOREIGN PATENTS

| | | |
|---|---|---|
| 376,289 | France | Aug. 5, 1907 |